(12) United States Patent
Srinivasan et al.

(10) Patent No.: US 8,259,634 B2
(45) Date of Patent: Sep. 4, 2012

(54) SLEEP-MODE WIRELESS CELL RESELECTION APPARATUS, SYSTEMS, AND METHODS

(75) Inventors: Roshni Srinivasan, Palo Alto, CA (US); Muthaiah Venkatachalam, Beaverton, OR (US); Sameer Pareek, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/650,157

(22) Filed: Dec. 30, 2009

(65) Prior Publication Data

US 2011/0103279 A1  May 5, 2011

Related U.S. Application Data

(63) Continuation of application No. 11/551,421, filed on Oct. 20, 2006, now Pat. No. 7,693,555.

(60) Provisional application No. 60/729,165, filed on Oct. 21, 2005.

(51) Int. Cl.
    *H04W 52/02* (2009.01)
(52) U.S. Cl. .......................... 370/311; 455/574
(58) Field of Classification Search .................. 455/445, 455/432.1, 522, 506, 419, 569.1, 574; 370/342, 370/311; 375/142, 130, E1.032, 349, 150; 342/457; 343/702, 848, 725
    See application file for complete search history.

(56) References Cited

U.S. PATENT DOCUMENTS

| 6,089,456 | A | 7/2000 | Walsh et al. |
| 6,680,920 | B1 * | 1/2004 | Wan .............................. 370/311 |
| 6,742,036 | B1 | 5/2004 | Das et al. |
| 6,763,224 | B2 | 7/2004 | Davies et al. |
| 7,042,864 | B1 | 5/2006 | Leung et al. |
| 7,236,477 | B2 | 6/2007 | Emeott et al. |
| 7,263,371 | B2 | 8/2007 | Das et al. |
| 7,313,394 | B2 | 12/2007 | Bakshi |
| 2002/0036985 | A1 * | 3/2002 | Jonas et al. .................... 370/235 |
| 2002/0114469 | A1 | 8/2002 | Faccin et al. |
| 2002/0193110 | A1 | 12/2002 | Julka et al. |
| 2004/0218609 | A1 | 11/2004 | Foster et al. |
| 2004/0235536 | A1 | 11/2004 | Kim et al. |

(Continued)

FOREIGN PATENT DOCUMENTS

EP  1484863 A1  12/2004

(Continued)

OTHER PUBLICATIONS

Non-Final Office Action Response filed on Oct. 23, 2008 for U.S. Appl. No. 11/208,427, for Non-Final Office Action mailed on May 22, 2008, 15 pgs.

(Continued)

*Primary Examiner* — Jean Gelin
*Assistant Examiner* — Mahendra Patel
(74) *Attorney, Agent, or Firm* — Kacvinsky Daisak, PLLC

(57) ABSTRACT

Embodiments herein may receive a ranging request message with a sleep-mode indication from a mobile node at a destination base station in a wireless packet-switched network. System paging information may be accessed to determine a base station identifier associated with an originating base station that last served the mobile node. The originating base station may be contacted to retrieve a service context associated with the mobile node and any downlink packets buffered for the mobile node by the originating base station. Other embodiments may be described and claimed.

14 Claims, 4 Drawing Sheets

U.S. PATENT DOCUMENTS

| | | | |
|---|---|---|---|
| 2004/0242233 A1 | 12/2004 | Lutgen | |
| 2004/0243298 A1 | 12/2004 | Knuuttila et al. | |
| 2005/0041573 A1* | 2/2005 | Eom et al. | 370/208 |
| 2005/0049012 A1* | 3/2005 | Chang et al. | 455/574 |
| 2005/0054389 A1 | 3/2005 | Lee et al. | |
| 2005/0075148 A1 | 4/2005 | Park | |
| 2005/0096051 A1* | 5/2005 | Lee et al. | 455/438 |
| 2005/0128990 A1* | 6/2005 | Eom et al. | 370/338 |
| 2005/0197171 A1* | 9/2005 | Son et al. | 455/574 |
| 2005/0213555 A1 | 9/2005 | Eyuboglu et al. | |
| 2005/0282562 A1 | 12/2005 | Lee et al. | |
| 2006/0019708 A1 | 1/2006 | Raman et al. | |
| 2006/0028984 A1 | 2/2006 | Wu et al. | |
| 2006/0039320 A1 | 2/2006 | Kang et al. | |
| 2006/0104234 A1 | 5/2006 | Zhang | |
| 2007/0005972 A1 | 1/2007 | Mizikovsky et al. | |
| 2007/0016774 A1 | 1/2007 | Bakshi | |
| 2007/0042776 A1 | 2/2007 | Bakshi et al. | |
| 2007/0086395 A1 | 4/2007 | Bakshi et al. | |
| 2007/0087767 A1 | 4/2007 | Pareek et al. | |
| 2007/0104179 A1 | 5/2007 | Srinivasan et al. | |
| 2010/0178920 A1* | 7/2010 | Kitazoe et al. | 455/436 |
| 2010/0202403 A1* | 8/2010 | Premec | 370/331 |
| 2011/0149926 A1* | 6/2011 | Li et al. | 370/338 |

FOREIGN PATENT DOCUMENTS

| | | |
|---|---|---|
| JP | 2003-018195 | 1/2003 |
| WO | 2004/064434 A2 | 7/2004 |
| WO | 2005/120178 A2 | 12/2005 |
| WO | 2005/120181 A2 | 12/2005 |
| WO | 2007/011995 A1 | 1/2007 |
| WO | 2007/011995 B1 | 3/2007 |
| WO | 2007/024436 A1 | 3/2007 |
| WO | 2007/044990 A2 | 4/2007 |
| WO | 2007/048056 | 4/2007 |
| WO | 2007/044990 A3 | 5/2007 |

OTHER PUBLICATIONS

Non-Final Office Action received for U.S. Appl. No. 11/208,427, mailed May 22, 2008, 33 pgs.
Final Office Action received for U.S. Appl. No. 11/208,427 mailed on Jan. 15, 2009, 20 pgs.
Non-Final Office Action Response filed on May 6, 2008 for U.S. Appl. No. 11/251,066, for Non-Final Office Action mailed Feb. 6, 2008, 16 pgs.
Final Office Action received for U.S. Appl. No. 11/251,066 mailed on Aug. 19, 2008, 23 pgs.
Agilent Technologies 8935 Series E6380A CDMA Cellular/ PCS Base Station Test Set and E6381A TDMA Base Station Test Set, Agilent Technologies, Mar. 2000, pp. 1-329.
Non-Final Office Action received for U.S. Appl. No. 11/251,066, mailed on Feb. 6, 2008, 19 pgs.
Final Office Action received for U.S. Appl. No. 11/182,498 mailed on Apr. 16, 2007, 7 pgs.
Non-Final Office Action received for U.S. Appl. No. 11/182,498 mailed on Oct. 13, 2006, 11 pgs.
Notice of Allowance received for U.S. Appl. No. 11/182,498 mailed on Aug. 15, 2007, 8 pgs.
Final Office Action Response filed on May 23, 2007, for U.S. Appl. No. 11/182,498, for Final Office Action mailed Apr. 16, 2007, 9 pgs.
Non-Final Office Action Response filed on Dec. 11, 2006, for U.S. Appl. No. 11/182,498, for Non Final Office Action mailed on Oct. 13, 2006, 13 pgs.
Perkins, "IP Mobility Support for IPv4, Request for Comments: 3344",http://rfc-3344.rfc-index.com/, Aug. 2002, 99 pgs.
Pack et al., "Performance Analysis of IP Paging Protocol in IEEE 802.11Networks", Proceedings of the 28th Annual IEEE International Conference on Local Computer Networks, Oct. 20, 2003, pp. 673-680.
Nakhjiri, "EAP based Proxy Mobile IP key bootstrapping for WiMAX",Standard-Working-Draft,Internet Engineering Task Force,IETF , Jan. 2005.
Chung et al., "Performance Analysis of IP Paging and Power Saving Mode in IP-Based Mobile Networks", 15th IEEE International Symposium on Barcelona, 3., Sep. 5, 2004, pp. 1533-1537.
Aboba et al., "Extensible Authentication Protocol (EAP) Key Management Framework", Standard-Working-Draft, Internet Engineering Task Force, IETF, Nov. 14, 2004.
Draft IEEE Standard for Local and Metropolitan Area Networks Part 16: Air Interface for Fixed and Mobile Broadband Wireless Access Systems Amendment for Physical and Medium Access Control Layers for Combined Fixed and Mobile Operation in Licensed Bands, IEEE 802.16 working group on broadband wireless access, Draft IEEE Standard for Local and Metropolitan Area Networks, Oct. 14, 2005, pp. 1-684.
Perkins et al., "Authentication, Authorization, and Accounting (AAA) Registration Keys for Mobile IPv4—Request for Comments: 3957",http://www.faqs.org/ftp/rfc/pdf/rfc3957.txt.pdf, Mar. 2005, 27 pgs.
Mobile IP, http://www.cisco.com/univercd/cc/td/doc/product/software/ios120/120newft/120t/120t1/mobileip.htm, Cisco, Oct. 3, 2003, pp. 1-56.
Final Office Action received for U.S. Appl. No. 11/551,421 mailed on Jul. 8, 2009, 21 pgs.
Non-Final Office Action received for U.S. Appl. No. 11/551,421 mailed on Dec. 31, 2008, 19 pgs.
Notice of Allowance received for U.S. Appl. No. 11/551,421 mailed on Nov. 18, 2009, 6 pgs.
Final Office Action Response filed on Oct. 1, 2009, for U.S. Appl. No. 11/551,421, for Final Office Action mailed Jul. 8, 2009, 16 pgs.
Non-Final Office Action Response filed on Mar. 31, 2009, for U.S. Appl. No. 11/551,421, for Non Final Office Action mailed on Dec. 31, 2008, 12 pgs.
Advisory Action received for U.S. Appl. No. 11/551,421 mailed on Oct. 14, 2009, 2 pgs.
Advisory Action Response filed on Oct. 20, 2009, for U.S. Appl. No. 11/551,421, for Advisory Action mailed Oct. 14, 2009, 2 pgs.
Bakshi, "Secure Proxy Mobile Apparatus, Systems, and Methods", U.S. Appl. No. 11/182,498, filed Jul. 15, 2005.
Bakshi et al., "Wireless Packet-Switched Paging Apparatus, Systems, and Methods", U.S. Appl. No. 11/208,427, filed Aug. 19, 2005.
Bakshi et al., "Wreless Paging Apparatus, Systems and Methods", No. 11/251,066, filed Oct. 14, 2005.
Pareek et al., "Techniques to Manage Paging Operations for Idle Mode Mobile Stations", U.S. Appl. No. 11/252,297, filed 17, 2005.

* cited by examiner

SLEEP-MODE WIRELESS CELL RESELECTION APPARATUS, SYSTEMS, AND METHODS

This application is a continuation of U.S. application Ser. No. 11/551,421, filed on Oct. 20, 2006, which claims the benefit of priority under 35 U.S.C. 119(e) to U.S. Provisional Patent Application Ser. No. 60/729,165, filed on Oct. 21, 2005. U.S. application Ser. No. 11/551,421 and U.S. Provisional Patent Application Ser. No. 60/729,165 are incorporated herein by reference in their entirety.

TECHNICAL FIELD

Various embodiments described herein relate to wireless communications generally, including apparatus, systems, and methods used to reselect a cell during sleep-mode operation and to forward buffered packets to a mobile node.

BACKGROUND INFORMATION

Emerging wireless network technologies may include wireless networks designed with a packet-switched architecture. Such a network may be referred to herein as a wireless packet-switched network (WPSN). A mobile wireless device ("mobile node") operating within a WPSN may be capable of communicating a variety of media, including perhaps data, voice, and video, among others. Internet protocol (IP) datagrams may be utilized.

A mobile node that is connected to a WPSN may alternate between states of active transmission and reception or inactivity. Intervals associated with these states may depend upon characteristics of an application supported by the connection. An Institute of Electrical and Electronic Engineers 802.16e™ standard may specify special modes of operation designed to conserve battery power and air link resources during periods of inactivity. Additional information regarding the IEEE 802.16e™ protocol standard may be found in 802.16e™: IEEE Standard for Local and Metropolitan Area Networks— Part 16: Air Interface for Fixed and Mobile Broadband Wireless Access Systems—Amendment 2: Physical and Medium Access Control Layers for Combined Fixed and Mobile Operation in Licensed Bands (published Feb. 28, 2006).

The mobile node may negotiate the periods of inactivity with a serving base station. These periods may be known as sleep intervals. Sleep intervals may alternate with listening intervals. "Keep-alive" packets may be exchanged during listening intervals in order to maintain the network connection. Durations of sleep intervals and listening intervals may be a function of power saving class attributes associated with active connections maintained by the mobile node. Power saving classes may take into consideration quality-of-service (QoS) parameters associated with active connections. These dependencies may operate to control sleep intervals and listening intervals such that latency requirements associated with the various connections may be satisfied.

The mobile node does not communicate with the serving base station during sleep intervals. Thus, the mobile node may power down one or more operational components or may perform other activities that do not require communication with the serving base station during sleep intervals. During listening intervals, however, the mobile node is expected to receive all downlink transmissions as in normal operation.

To prevent packet loss, the serving base station may buffer traffic addressed to connections bound to the sleeping mobile node. The serving base station may subsequently broadcast a traffic indicator message to the mobile node during the next listening interval to alert the mobile node that packets await transmission in the downlink. The traffic indicator message may be broadcast from the serving base station to all associated mobile nodes that are in sleep mode and that have downlink traffic pending.

During a listening interval, the mobile node may return to normal (non sleep-mode) operation if it decodes its own connection identifier from the traffic indicator message. A lack of synchronization with the serving base station may also force the mobile node to return to normal-mode operation. In the absence of any such normal-mode triggers, the mobile node may begin a new sleep interval.

The serving base station may maintain a service context for the mobile node during sleep-mode operation. The service context may comprise parameters indicative of types of applications and of a QoS level associated with the current connection. The mobile node may remain within a range of the serving base station between a time of initiating the sleep-mode cycle and a start of the next listening interval. In that case, any downlink packets buffered in the serving base station can be forwarded to the mobile node after the mobile node transitions to the listening mode, receives the traffic indicator message, and resumes normal operation.

Some mobile nodes may be capable of a macro-diversity mode of operation. One or more active power-saving classes may require maintenance of a serving base station identifier (BSID). The power-saving classes may also require maintenance of a list of potential serving base station candidates (a "diversity set"), perhaps ordered according to some priority. If a macro-diversity hand-off (MDHO)/fast base station switching (FBSS) duration as specified in a mobile sleep response message has not expired, the macro diversity-capable mobile node may continue to update the diversity set and the serving BSID while in sleep mode. Downlink traffic may be buffered for the mobile node at each base station in the diversity set during the sleep-mode interval. The buffered traffic may be forwarded to the mobile node by the serving base station during the next listening interval.

Other mobile nodes may be incapable of macro diversity-mode operation, however. Any downlink packets buffered for a non macro diversity-capable mobile node in the prior-serving base station before handoff may be lost.

DETAILED DESCRIPTION

Figure 1:
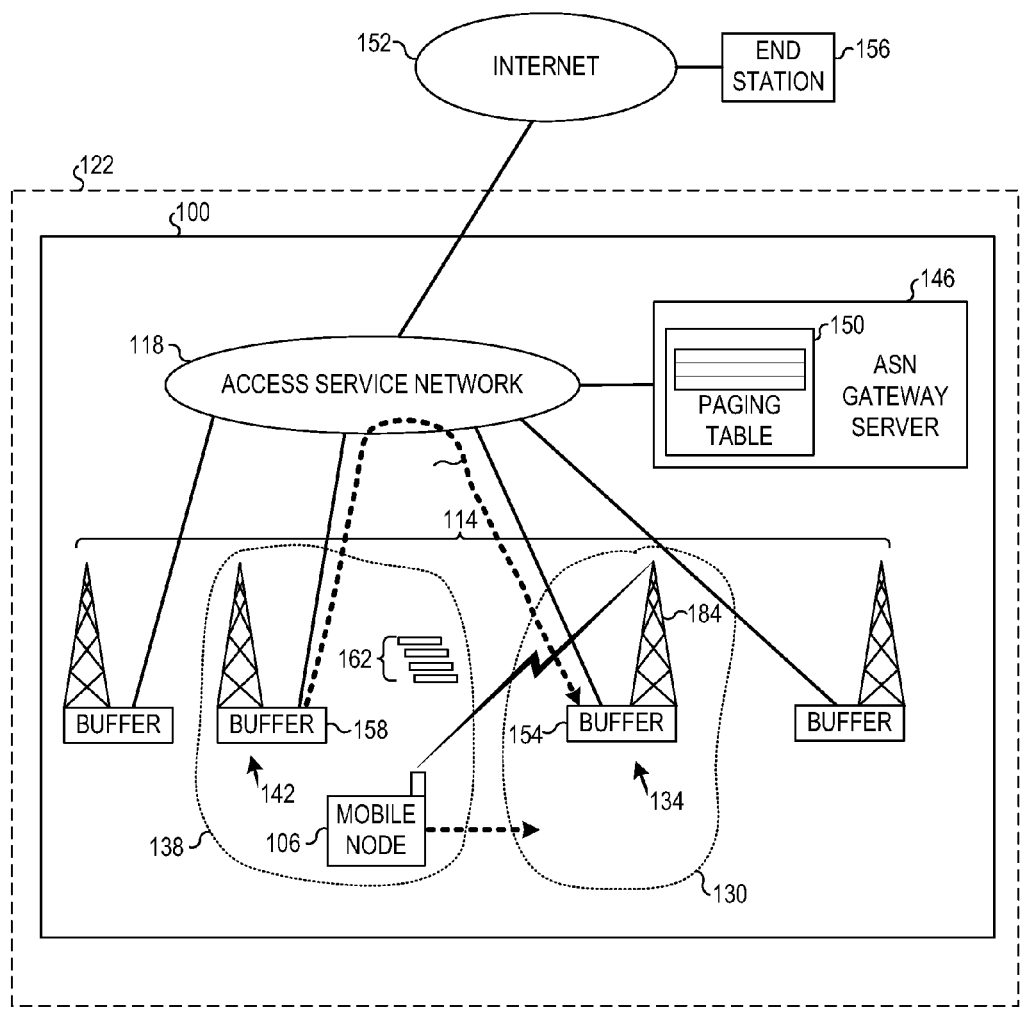
FIG. 1 is a block diagram of a representative system according to various embodiments of the invention.

FIG. 1 is a block diagram of a representative system 100 according to various embodiments of the invention. In general, embodiments herein may buffer and transmit packets to a mobile node (e.g., the mobile node 106) that is in sleep mode during handoff from one base station to another if the mobile node 106 does not support macro diversity. If such a mobile node enters the listening state after moving out of range of a base station with which it originally negotiated sleep mode (e.g., the originating base station 142), the mobile node 106 may detect a new serving base station (e.g., the destination base station 134). The mobile node 106 may then initiate a ranging process with the destination base station 134 in order to stay connected to the network. The mobile node 106 may use a ranging request message to indicate to the destination base station 134 that the mobile station 106 is in sleep mode. Some systems may cause the base station to signal the mobile node 106 to update its sleep identification in a corresponding ranging response message. The sleep identification may be updated to a newly assigned sleep identification in order to allow the mobile node 106 to continue sleep-mode operation. Other systems may maintain the sleep identification differently.

A set of base stations 114 may be coupled to an access service network (ASN) 118 in a WPSN 122. The ASN 118 may couple the destination base station 134 to the originating base station 142 to enable packet communications between the destination base station 134 and the originating base station 142. The mobile node 106 may move to a destination radio-frequency (RF) coverage area 130 associated with the destination base station 134 from an originating RF coverage area 138 associated with the originating base station 142. The destination base station 134 may obtain an identifier (e.g. a BSID) associated with the originating base station 142 by querying an ASN gateway server 146. The destination base station 134 may then communicate with the originating base station 142 across a path 166 to retrieve a service context and any packets that may be buffered at the originating base station 142.

The destination base station 134 may receive a ranging request message from the mobile node 106 as the mobile node 106 moves into the destination RF coverage area 130 from the originating RF coverage area 138. Operational parameters within the destination base station 134 may indicate that the destination base station 134 did not recently negotiate sleep-mode operation with the mobile node 106. The ranging request message may indicate that the mobile node 106 previously negotiated sleep-mode operation with a prior-serving base station (e.g., the originating base station 142). In some cases, however, the ranging request message may not identify the originating base station 142.

The destination base station 134 may respond with a ranging response message. The ranging response message may include an updated sleep identification associated with the destination base station 134. Some embodiments may not require a sleep identification update with the ranging response message. Although examples herein may be described with respect to particular wireless communication protocols, the methods, apparatus, and systems described herein may be implemented in accordance with other suitable wireless communication technologies/protocols such as variations and/or evolutions of the IEEE 802.16 family of standards.

The destination base station 134 may contact the ASN gateway server 146 to determine a BSID associated with the prior-serving base station. The ASN gateway server 146 may contain a paging table 150 of associations between active mobile nodes and base station(s) currently serving each active mobile node in the WPSN 122 or in a portion thereof. An entry in the paging table 150 may associate the mobile node 106 with the prior-serving base station (e.g., with the originating base station 142).

The ASN gateway server 146 may update the entry in the paging table 150 corresponding to the mobile node 106 with a BSID associated with the destination base station 134. Prior to effecting the update, however, the ASN gateway server 146 may send the BSID associated with the prior-serving base station to the destination base station 134. In response to receipt of the BSID associated with the prior-serving base station, the destination base station 134 may contact the prior-serving base station (e.g., the originating base station 142) directly across the ASN 118. The destination base station 134 may thereby obtain the service context for the mobile node 106 along with any packets buffered for the mobile node 106 in the originating base station 142.

The system 100 may thus include the destination base station 134 communicatively coupled to the originating base station 142 and to the ASN gateway server 146. The destination base station 134 may receive the ranging request message with a sleep-mode indication from the mobile node 106, as previously described. A service context associated with the mobile node 106 may not exist at the destination base station 134 at a time of receiving the ranging request message. An absence of the service context may indicate that the mobile node 106 moved into the destination RF coverage area 130 while in the sleep mode.

The originating base station 142 may have last served the mobile node 106, and may contain the service context associated with the mobile node 106. The service context may comprise a class of traffic, a quality of service associated with a connection maintained by the WPSN 122 on behalf of the mobile node 106, or both. The connection may comprise a connection between the mobile node 106 and an Internet 152, or between the mobile node 106 and an end-station 156 on the Internet 152. The mobile node 106 may be communicatively coupled to other suitable common public or private networks via the ASN 118.

The destination base station 134 may include paging query logic, as further described below. The paging query logic may query a network entity to determine a BSID associated with the originating base station 142. The network entity may comprise the ASN gateway server 146. The ASN gateway server 146 may be coupled to the ASN 118 to host the paging table 150. The paging table 150 may comprise a plurality of mobile station identifiers (MSIDs). Each MSID may be related by the paging table 150 to a corresponding BSID. The ASN gateway server 146 may respond to the query by providing the BSID associated with the originating base station 142.

The system 100 may also include a destination packet buffer 154 associated with the destination base station 134 and an originating packet buffer 158 associated with the originating base station 142. In some cases, one or more downlink packets 162 may have been buffered in the originating packet buffer 158 after the mobile node 106 entered the sleep mode. The downlink packets 162 may be retrieved when the mobile node 106 moves from the originating RF coverage area 138 to the destination RF coverage area 130. The downlink packets 162 may be transferred across the path 166 between the originating packet buffer 158 and the destination packet buffer 154. If necessary, the destination packet buffer 154 may store the downlink packets 162 retrieved by the destination base station 134 from the originating packet buffer 158. The downlink packets 162 may be stored until such time as the downlink packets 162 can be forwarded to the mobile node 106.

The system 100 may further include an antenna 184 coupled to a receiver associated with the destination base station 134. The antenna 184 may facilitate communication with the mobile node 106. The antenna 184 may comprise a patch, omnidirectional, beam, monopole, dipole, or slot antenna, among other types. The system 100 may further include an apparatus 200, described below. The apparatus 200 may be incorporated into a base station controller associated with the originating base station 142.

Figure 2:
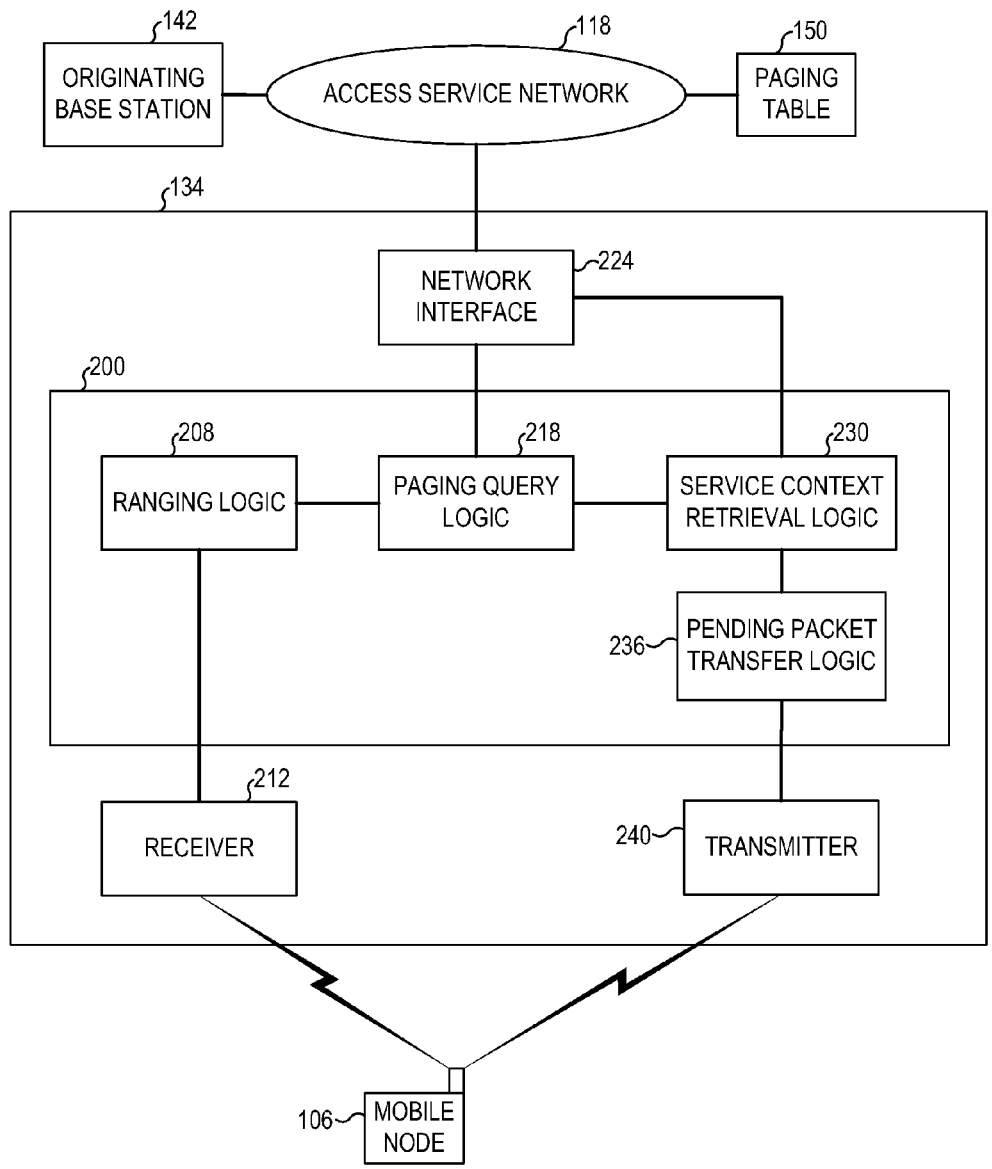
FIG. 2 is a block diagram of an apparatus according to various embodiments.

FIG. 2 is a block diagram of the apparatus 200 according to various embodiments. The apparatus 200 may include ranging logic 208 associated with a destination base station (e.g., the destination base station 134 of FIG. 1) in a WPSN (e.g., the WPSN 122 of FIG. 1). The ranging logic 208 may be coupled to a receiver 212 associated with the destination base station 134. The ranging logic 208 may receive a ranging request with a sleep-mode indication from a mobile node (e.g., from the mobile node 106 of FIG. 1) for which no service context exists at the destination base station 134.

The apparatus 200 may also include paging query logic 218 coupled to the ranging logic 208 and to a network interface 224. The paging query logic 218 may query a network entity (e.g., the paging table 150 across the ASN 118 of FIG. 1). The network entity may be queried to determine a BSID associated with an originating base station (e.g., the originating base station 142 of FIG. 1). The originating base station 142 may have last served the mobile node 106.

The apparatus 200 may further include service context retrieval logic 230 coupled to the paging query logic 218 and to the network interface 224. The service context retrieval logic 230 may contact the originating base station 142 to retrieve a service context associated with the mobile node 106. The service context may comprise a class of traffic or a quality of service associated with a connection maintained by the WPSN on behalf of the mobile node 106. The connection in this context may comprise a connection between the mobile node 106 and the Internet 152, or between the mobile node 106 and another station on the Internet 152. The service context retrieval logic 230 may also retrieve any downlink packets (e.g., the downlink packets 162 of FIG. 1) pending for the mobile node 106 at the originating base station 142.

The apparatus 200 may also include pending packet transfer logic 236 coupled to the service context retrieval logic 230 and to a base station transmitter 240. The pending packet transfer logic 236 may broadcast a message including an MSID associated with the mobile node 106. The message may be transmitted to advise the mobile node 106 of downlink packets pending for the mobile node 106 at the destination base station 134. The pending packet transfer logic 236 may also cause the downlink packets to be transferred to the mobile node 106.

Any of the components previously described can be implemented in a number of ways, including embodiments in software. Thus, the system 100; the mobile node 106; the base stations 114, 134, 142; the ASN 118; the WPSN 122; the RF coverage areas 130, 138; the gateway server 146; the paging table 150; the Internet 152; the packet buffers 154, 158; the end station 156; the packets 162; the path 166; the antenna 184; the apparatus 200; the ranging logic 208; the receiver 212; the paging query logic 218; the network interface 224; the service context retrieval logic 230; the pending packet transfer logic 236; and the transmitter 240 may all be characterized as "modules" herein.

The modules may include hardware circuitry, single or multi-processor circuits, memory circuits, software program modules and objects, firmware, and combinations thereof, as desired by the architect of the system 100 and the apparatus 200 and as appropriate for particular implementations of various embodiments.

It should also be understood that the apparatus and systems of various embodiments can be used in applications other than contacting an ASN gateway server to obtain a BSID to use to retrieve a service context and any buffered packets associated with a roving mobile node. Thus, various embodiments of the invention are not to be so limited. The illustrations of the system 100 and the apparatus 200 are intended to provide a general understanding of the structure of various embodiments. They are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 players), vehicles, medical devices (e.g., heart monitor, blood pressure monitor, etc.) and others. Some embodiments may include a number of methods.

Figure 3:
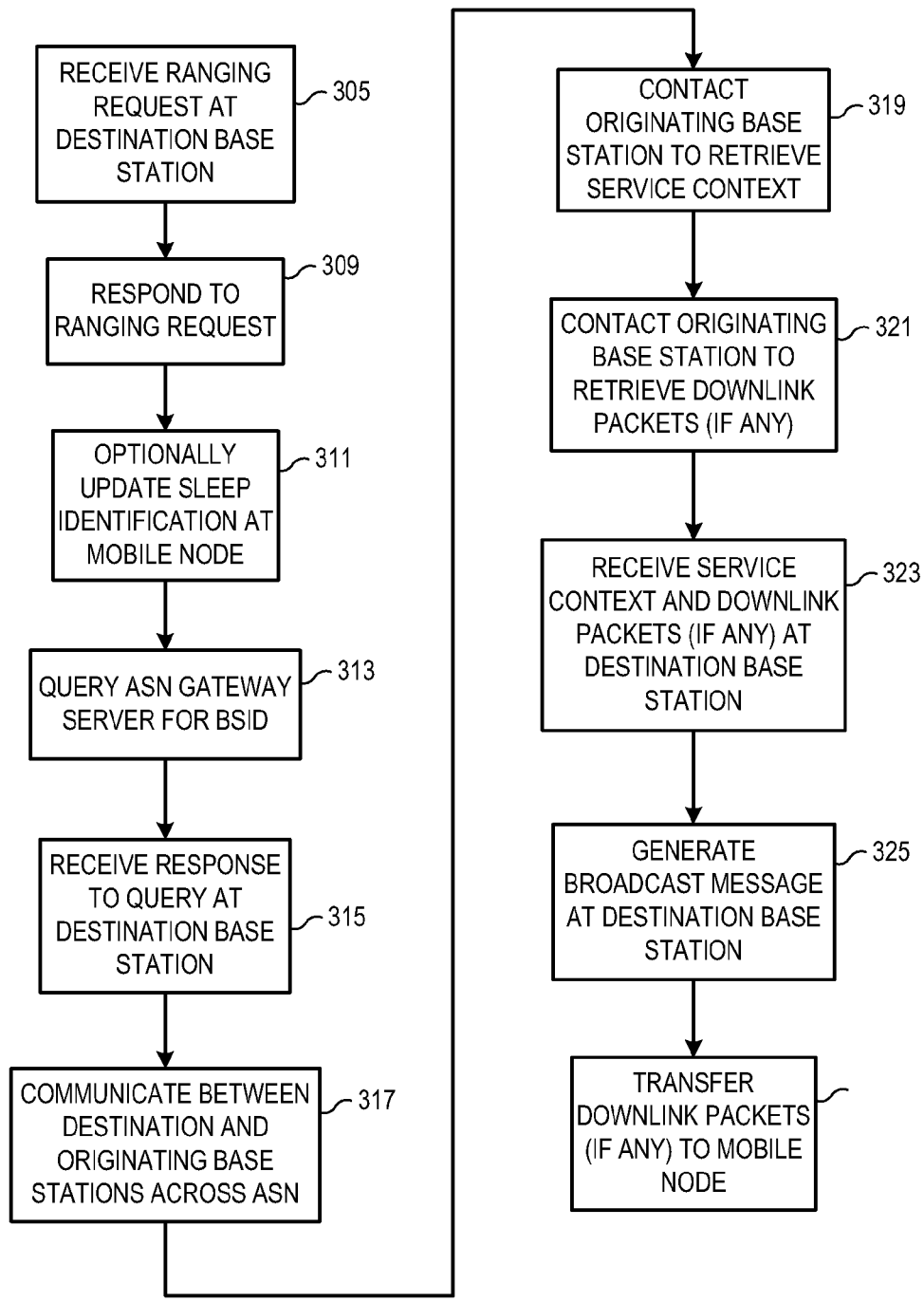
FIG. 3 is a flow diagram illustrating several methods according to various embodiments.

FIG. 3 is a flow diagram illustrating several methods according to various embodiments. A method 300 may begin at block 305 with receiving a ranging request message with a sleep-mode indication at a destination base station. The ranging request message may be received from a mobile node operating within a WPSN. Referring back to FIG. 1, the ranging request message may be received at the destination base station 134, for example.

A service context associated with the mobile node may not exist at the destination base station at a time of receiving the ranging request. An absence of the service context may indicate that the mobile node moved into a destination area of RF coverage associated with the destination base station while in a sleep mode. For example, the mobile node 106 of FIG. 1 may have moved into the destination area of RF coverage 130. The service context may comprise a class of traffic, a quality of service associated with a connection maintained by the WPSN on behalf of the mobile node, or both, as previously described.

The method 300 may continue at block 309 with responding to the ranging request message with a ranging response message transmitted from the destination base station to the mobile node. The mobile node may optionally be updated by the destination base station with a sleep identification associated with the destination base station, at block 311.

A BSID associated with an originating base station may be determined from system paging information. The originating base station may have last served the mobile node. For example, the originating base station 142 of FIG. 1 may comprise the last-serving base station.

The system paging information may be contained in a network resource accessible by a plurality of base stations, including a paging table. The paging table may comprise a plurality of MSIDs, each MSID related by the paging table to a corresponding BSID. In an embodiment, the paging table may be associated with an ASN gateway server coupled to an ASN. The paging table 150 of FIG. 1 may, for example, be associated with the ASN gateway server 146 coupled to the ASN 118. The method 300 may include querying the ASN gateway server to index the BSID from the paging table, at block 313. The BSID may be indexed from the paging table using an MSID associated with the mobile node and supplied by the destination base station.

The method 300 may include receiving a response to the query at the destination base station, at block 315. The response may comprise the MSID and the BSID associated with the originating base station as indexed from the paging table. The method 300 may also include communicating between the destination and originating base stations across the ASN, at block 317. The destination base station may contact the originating base station to retrieve the service context associated with the mobile node, at block 319. The destination base station may also retrieve any downlink packets buffered for the mobile node by the originating base station, at block 321. The service context and the downlink packets, if any, may be received at the destination base station, at block 323.

The method 300 may further include generating a broadcast message at the destination base station to advise the mobile node of the downlink packets, if any, pending at the destination base station, at block 325. The broadcast message may include an identifier (e.g., an MSID or a sleep identification) associated with the mobile node. In one example, the broadcast message may comprise a traffic indicator configured in accordance with an IEEE 802.16e standard. The method 300 may conclude at block 329 with transferring the downlink packets, if any, to the mobile node from the destination base station.

It may be possible to execute the activities described herein in an order other than the order described. And, various activities described with respect to the methods identified herein can be executed in repetitive, serial, or parallel fashion.

A software program may be launched from a computer-readable medium (CRM) in a computer-based system to execute functions defined in the software program. Various programming languages may be employed to create software programs designed to implement and perform the methods disclosed herein. The programs may be structured in an object-oriented format using an object-oriented language such as Java or C++. Alternatively, the programs may be structured in a procedure-oriented format using a procedural language, such as assembly or C. The software components may communicate using a number of mechanisms well known to those skilled in the art, such as application program interfaces or interprocess communication techniques, including remote procedure calls. The teachings of various embodiments are not limited to any particular programming language or environment. Thus, other embodiments may be realized, as discussed regarding FIG. 4 below.

Figure 4:
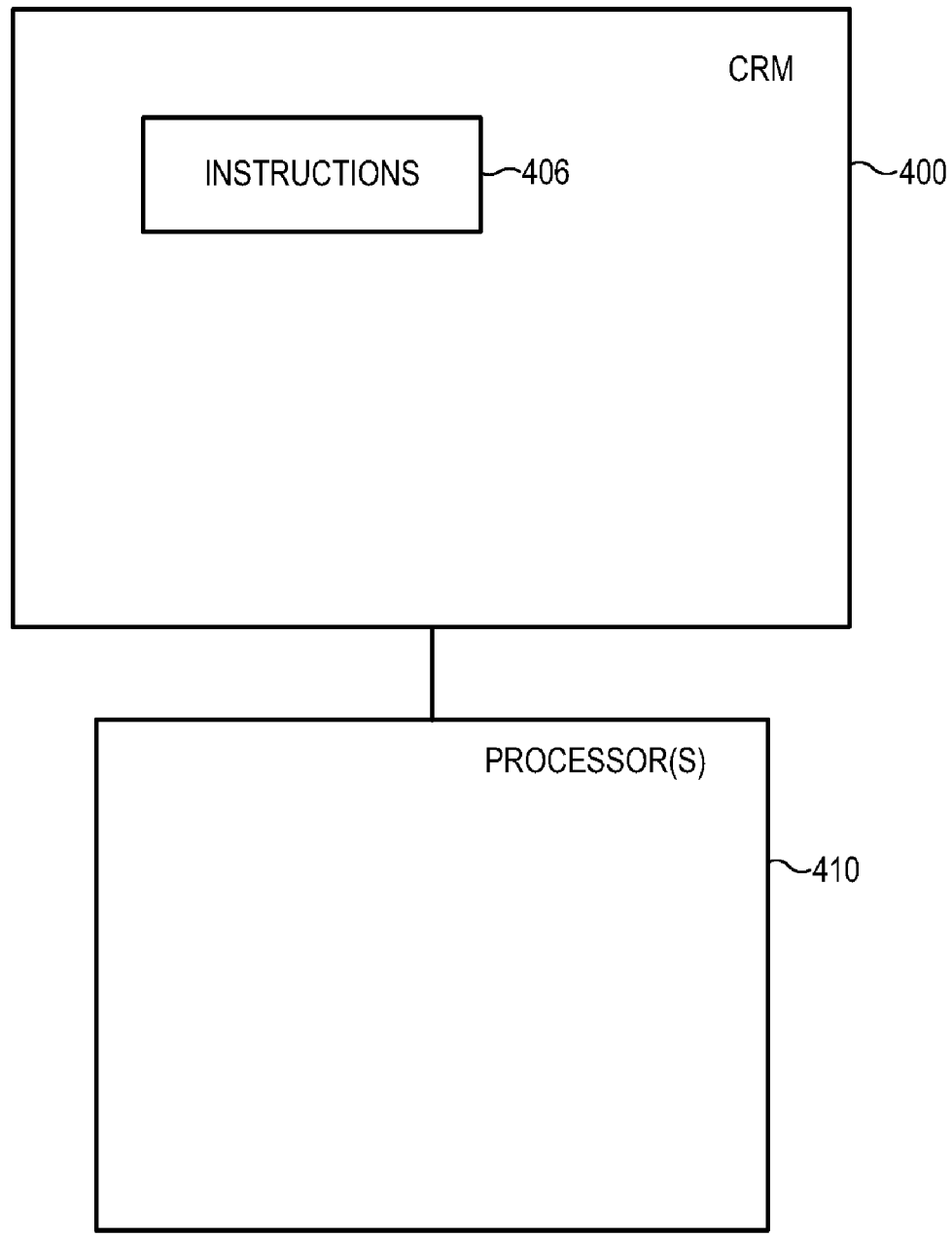
FIG. 4 is a block diagram of a computer-readable medium according to various embodiments.

FIG. 4 is a block diagram of a CRM 400 according to various embodiments. Examples of such embodiments may comprise a memory system, a magnetic or optical disk, or some other storage device. The CRM 400 may contain instructions 406 which, when accessed, result in one or more processors 410 performing any of the activities previously described, including those discussed with respect to the method 300 noted above.

Implementing the apparatus, systems, and methods disclosed herein may provide a mode of retrieving packets buffered for a diversity-incapable mobile node that is handed off to a base station while the mobile node is in a sleep state. The disclosed embodiments may be implemented without requiring changes to existing wireless packet formats.

Although the inventive concept may include embodiments described in the exemplary context of an Institute of Electrical and Electronic Engineers (IEEE) standard 802.xx implementation (e.g., 802.11, 802.11a, 802.11b, 802.11e, 802.11g, 802.16, 802.16e™, etc.), the claims are not so limited. Additional information regarding the IEEE 802.11a protocol standard may be found in "IEEE Std 802.11a, Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications—High-speed Physical Layer in the 5 GHz Band" (published 1999; reaffirmed Jun. 12, 2003). Additional information regarding the IEEE 802.11b protocol standard may be found in "IEEE Std 802.11b, Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band" (approved Sep. 16, 1999; reaffirmed Jun. 12, 2003). Additional information regarding the IEEE 802.11e standard may be found in "IEEE 802.11e Standard for Information technology—Telecommunications and information exchange between systems—Local and metropolitan area networks—Specific requirements Part 11: Wireless LAN Medium Access Control (MAC) and Physical Layer (PHY) specifications: Amendment 8: Medium Access Control (MAC) Quality of Service Enhancements" (published 2005). Additional information regarding the IEEE 802.11g protocol standard may be found in "IEEE Std 802.11g™, IEEE Standard for Information technology—Telecommunications and information exchange between systems—Local and metropolitan area networks—Specific requirements Part 11: Wireless LAN Medium Access Control (MAC) and Physical Layer (PHY) specifications Amendment 4: Further Higher Data Rate Extension in the 2.4 GHz Band" (approved Jun. 12, 2003). Additional information regarding the IEEE 802.16 protocol standard may be found in "IEEE Standard for Local and Metropolitan Area Networks—Part 16: Air Interface for Fixed Broadband Wireless Access Systems" (published Oct. 1, 2004).

Embodiments of the present invention may be implemented as part of a wired or wireless system. Examples may also include embodiments comprising multi-carrier wireless communication channels (e.g., orthogonal frequency division multiplexing (OFDM), discrete multitone (DMT), etc.) such as may be used within a wireless personal area network (WPAN), a wireless local area network (WLAN), a wireless metropolitan area network (WMAN), a wireless wide area network (WWAN), a cellular network, a third generation (3G) network, a fourth generation (4G) network, a universal mobile telephone system (UMTS), and like communication systems without limitation.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom such that structural and logical substitutions and changes may be made without departing from the scope of this disclosure. This Detailed Description is therefore not to be taken in a limiting sense, and the scope of various embodiments is defined only by the appended claims along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments and other embodiments not specifically described herein will be apparent to those of skill in the art upon reviewing the above description.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A method, comprising:
   receiving a ranging request message from a mobile node at a destination base station in a wireless packet-switched network (WPSN), wherein no service context associated with the mobile node exists at the destination base station at a time of receiving the ranging request message, and wherein the mobile node is in a sleep mode;

identifying an originating base station that previously served the mobile node by determining a base station identifier (BSID) associated with the originating base station from the ranging request message;

retrieving an original service context associated with the mobile node, the original service context comprising at least one of a class of traffic or a quality of service associated with a connection maintained by the WPSN on behalf of the mobile node; and responding to the ranging request message with a ranging response message;

wherein the original service context is retrieved by the destination base station from the originating base station based on the destination base station contacting the originating base station.

2. The method of claim 1, further comprising:
communicating between the destination base station and the originating base station across an access service network (ASN).

3. The method of claim 1, further comprising:
receiving the service context associated with the mobile node from the originating base station.

4. The method of claim 1, wherein the originating base station last served the mobile node.

5. The method of claim 1, wherein the service context is stored at the originating base station.

6. A non-transitory computer-readable medium having instructions, wherein the instructions, when executed, result in at least one processor performing:

receiving a ranging request message from a mobile node at a destination base station in a wireless packet-switched network (WPSN), wherein no service context associated with the mobile node exists at the destination base station at a time of receiving the ranging request message, and wherein the mobile node is in a sleep mode;

identifying an originating base station that previously served the mobile node by determining a base station identifier (BSID) associated with the originating base station from the ranging request message;

retrieving an original service context associated with the mobile node, the original service context comprising at least one of a class of traffic or a quality of service associated with a connection maintained by the WPSN on behalf of the mobile node; and responding to the ranging request message with a ranging response message;

wherein the original service context is retrieved by the destination base station from the originating base station based on the destination base station contacting the originating base station.

7. The non-transitory computer-readable medium of claim 6, wherein the instructions, when executed, result in the at least one processor performing:

communicating between the destination base station and the originating base station across an access service network (ASN).

8. The non-transitory computer-readable medium of claim 6, wherein the originating base station previously served the mobile node.

9. An apparatus, comprising:
logic associated with a destination base station in a wireless packet-switched network (WPSN) to receive a ranging request with a sleep-mode indication from a mobile node, wherein no service context associated with the mobile node exists at the destination base station, and wherein the mobile node is in a sleep mode;

logic to identify an originating base station that previously served the mobile node by determining a base station identifier (BSID) associated with the originating base station from the ranging request;

logic associated with the destination base station to contact the originating base station and retrieve a service context associated with the mobile node from the originating base station, the service context comprising at least one of a class of traffic or a quality of service associated with a connection maintained by the WPSN on behalf of the mobile node; and logic to respond to the ranging request with a ranging response, the ranging response sent to the mobile device.

10. The apparatus of claim 9, wherein the logic to retrieve the service context is to receive the service context from the originating base station.

11. The apparatus of claim 9, wherein the connection comprises an Internet connection with the mobile node.

12. The apparatus of claim 9, further comprising:
logic to communicate with the originating base station across an access service network (ASN).

13. A system, comprising:
logic associated with a destination base station in a wireless packet-switched network (WPSN) to receive a ranging request with a sleep-mode indication from a mobile node, wherein no service context associated with the mobile node exists at the destination base station, and wherein the mobile node is in a sleep mode;

logic to identify an originating base station that previously served the mobile node by determining a base station identifier (BSID) associated with the originating base station from the ranging request;

logic associated with the destination base station to contact the originating base station and retrieve a service context associated with the mobile node from the originating base station, the service context comprising at least one of a class of traffic or a quality of service associated with a connection maintained by the WPSN on behalf of the mobile node;

logic to respond to the ranging request with a ranging response, the ranging response sent to the mobile device; and an antenna to facilitate wireless communications with the mobile node; and wherein the service context is stored at the originating base station.

14. The system of claim 13, further comprising:
the originating base station; and
an access service network (ASN) to provide communications between the destination base station and the originating base station.

* * * * *

UNITED STATES PATENT AND TRADEMARK OFFICE
CERTIFICATE OF CORRECTION

PATENT NO. : 8,259,634 B2
APPLICATION NO. : 12/650157
DATED : September 4, 2012
INVENTOR(S) : Roshni Srinivasan et al.

It is certified that error appears in the above-identified patent and that said Letters Patent is hereby corrected as shown below:

In the drawings, Sheet 3, Fig. 3, the reference numeral 329 should be applied to the box containing the phrase "TRANSFER DOWNLINK PACKETS (IF ANY) TO MOBILE NODE."

Signed and Sealed this
Seventh Day of May, 2013

Teresa Stanek Rea
*Acting Director of the United States Patent and Trademark Office*